US011577763B2

(12) United States Patent
Mijatovic et al.

(10) Patent No.: US 11,577,763 B2
(45) Date of Patent: Feb. 14, 2023

(54) METHOD AND CONTROLLER FOR DETERMINING THE RELATIONSHIP BETWEEN A TRACK-CIRCUIT TRANSMITTED CURRENT SIGNAL AND A RAILWAY VEHICLE LOCATION ON A RAILWAY TRACK (71) Applicant: ALSTOM Transport Technologies, Saint-Ouen-sur-Seine (FR)

(72) Inventors: Nenad Mijatovic, Melbourne, FL (US); Jeffrey Fries, Grain Valley, MO (US); Jesse Herlocker, Grain Valley, MO (US)

(73) Assignee: ALSTOM TRANSPORT TECHNOLOGIES, Saint-Ouen-sur-Seine (FR)

( * ) Notice: Subject to any disclaimer, the term of this patent is extended or adjusted under 35 U.S.C. 154(b) by 536 days.

(21) Appl. No.: 16/811,244

(22) Filed: Mar. 6, 2020

(65) Prior Publication Data

US 2021/0276601 A1 Sep. 9, 2021

(51) Int. Cl.
*B61L 1/18* (2006.01)
*B61L 25/02* (2006.01)
*G06K 9/00* (2022.01)
*G08G 1/123* (2006.01)
*B61K 9/08* (2006.01)

(52) U.S. Cl.
CPC .............. *B61L 1/185* (2013.01); *B61L 25/025* (2013.01); *B61L 25/026* (2013.01); *G06K 9/00543* (2013.01); *G08G 1/123* (2013.01); *B61K 9/08* (2013.01)

(58) Field of Classification Search
CPC .. B61L 1/185; B61L 1/188; B61L 3/10; B61L 23/044; B61L 25/025; B61L 25/026; B61L 27/53; B61K 9/08; G06K 9/00543; G08G 1/123
USPC ............................................ 246/34 R, 122 R
See application file for complete search history.

(56) References Cited

U.S. PATENT DOCUMENTS

| 2008/0296441 | A1* | 12/2008 | Anderson | B61L 23/044 246/121 |
| 2015/0367872 | A1* | 12/2015 | Plotnikov | B61L 3/18 246/121 |
| 2018/0178821 | A1* | 6/2018 | Fries | H04B 3/48 |
| 2020/0011015 | A1* | 1/2020 | Mijatovic | B61L 27/53 |

(Continued)

FOREIGN PATENT DOCUMENTS

| CN | 107215357 A * | 9/2017 | B61K 9/08 |
| CN | 108238066 A * | 7/2018 | B61K 9/08 |

(Continued)

*Primary Examiner* — Zachary L Kuhfuss
(74) *Attorney, Agent, or Firm* — Nixon & Vanderhye (57) ABSTRACT Disclosed is a method for determining the relationship between a track-circuit current signal and a railway vehicle location, including: sending, by a track circuit, current signal across a railway track block; measuring the current signal for different railway vehicles running successively on the railway track block; aligning the measured current signals and calculating a reference curve as the average value of all the aligned curves by using a Dynamic Time Warping algorithm, this reference curve representing the relationship between the track-circuit current signal and the railway vehicle location on the railway track block.

20 Claims, 9 Drawing Sheets (56) References Cited

U.S. PATENT DOCUMENTS

| | | | |
|---|---|---|---|
| 2020/0156674 A1* | 5/2020 | Qin | B61K 9/08 |
| 2020/0307660 A1* | 10/2020 | Fries | B61L 1/20 |
| 2021/0122402 A1* | 4/2021 | Böhm | B61L 23/045 |
| 2021/0139059 A1* | 5/2021 | Schmidt | B61L 1/185 |
| 2022/0258781 A1* | 8/2022 | Mijatovic | B61L 25/02 |

FOREIGN PATENT DOCUMENTS

| | | | | |
|---|---|---|---|---|
| CN | 108256738 A | * | 7/2018 | G06K 9/6223 |
| KR | 101823067 B1 | * | 1/2018 | B61L 5/06 |

* cited by examiner

FIG.1

| Algorithm 1: DTW with Averaging for TC Reference Sequence Calculation |
|---| input: a list with train move data sequences, $I_1, I_2, ..., I_T$ and number of algorithm iterations N.

output: TC reference sequence, $R = <r_1, r_2, ..., r_P>$ 1 begin
2    Initialize the TC reference sequence $R_i$
3    repeat
4       for i=1 to T do
5          Calculate DTW ($I_i$, R) between the ith train move and reference sequence;
6          Find all elements of the ith train move sequence that are associated with appropriate elements of the reference sequence using DTW;
7       end
8       Update the elements of the reference sequence $\{r_p\}_{p=1}^{P}$ as the average value of all associated elements of all train moves;
9    until Number of iterations reached OR no new DTW updates
10 end

METHOD AND CONTROLLER FOR DETERMINING THE RELATIONSHIP BETWEEN A TRACK-CIRCUIT TRANSMITTED CURRENT SIGNAL AND A RAILWAY VEHICLE LOCATION ON A RAILWAY TRACK

BACKGROUND OF THE INVENTION

Field of the Invention

The present invention relates to a method for determining the relationship between a track-circuit transmitted current signal and a railway vehicle location on a railway track.

Further, the present invention relates to a controller for determining the relationship between a track-circuit transmitted current signal and a railway vehicle location on a railway track.

Description of the Related Art

Track circuits are used to locate the position of a railway vehicle within a railway track, for enabling virtual signaling within advanced railway vehicle control systems.

In fact, railroads that have implemented Positive Train Control systems (e.g. ITCS, ETCS, I-ETMS etc.) as overlays to existing signal systems, ultimately desire to move towards a virtual signal system where no physical signals exist. Virtual signal systems can allow railroads to realize more capacity without having to physically install more signals and shorten existing signal blocks. Virtual signal systems also eliminate the maintenance associated with physical signals (for example replacing lamps, aligning signals, cleaning lenses, etc.). In order to realize virtual signaling, the location of a railway vehicle in a railway track must be known.

In order to increase the exploitation capacity of a railway system, it is necessary to space railway vehicles more closely together, therefore, track-circuits can be used to localize railway vehicles to a smaller resolution between existing signals.

The track circuits use a measured amount of current transmitted into front axles of an approaching railway vehicle, or rear axles of a receding railway vehicle, to determine where the nearest axle is located along a railway track block.

However, the relationship between the track-circuit transmitted current signal and the actual location of the railway vehicle in the track block cannot be analytically analyzed (for example, using linear models) because it is non-linear. This relationship may in fact be different between different geographical locations, or due to different factors such as track circuit length, rail resistance, ballast resistance, railway vehicle axle resistance, weather conditions, etc.

As above indicated, track circuits use a track-circuit transmitted current signal to estimate the location of a railway vehicle within a railway track block.

Known systems need to know the relationship between a measured track-circuit transmitted current signal and the actual location of the railway vehicle, which is non-linear. This can be done by simulating the presence of a railway vehicle on a track block, through the placement of shunts across the railway track at carefully surveyed intervals. Shunts must be placed at several predetermined locations, not just the endpoints, due to the non-linear nature of the relationship. An assumption of a linear relationship would result in position errors in the estimates of the railway vehicle location, as shown in the graph of actual and estimated railway vehicle locations of FIG. 1.

Figure 1:
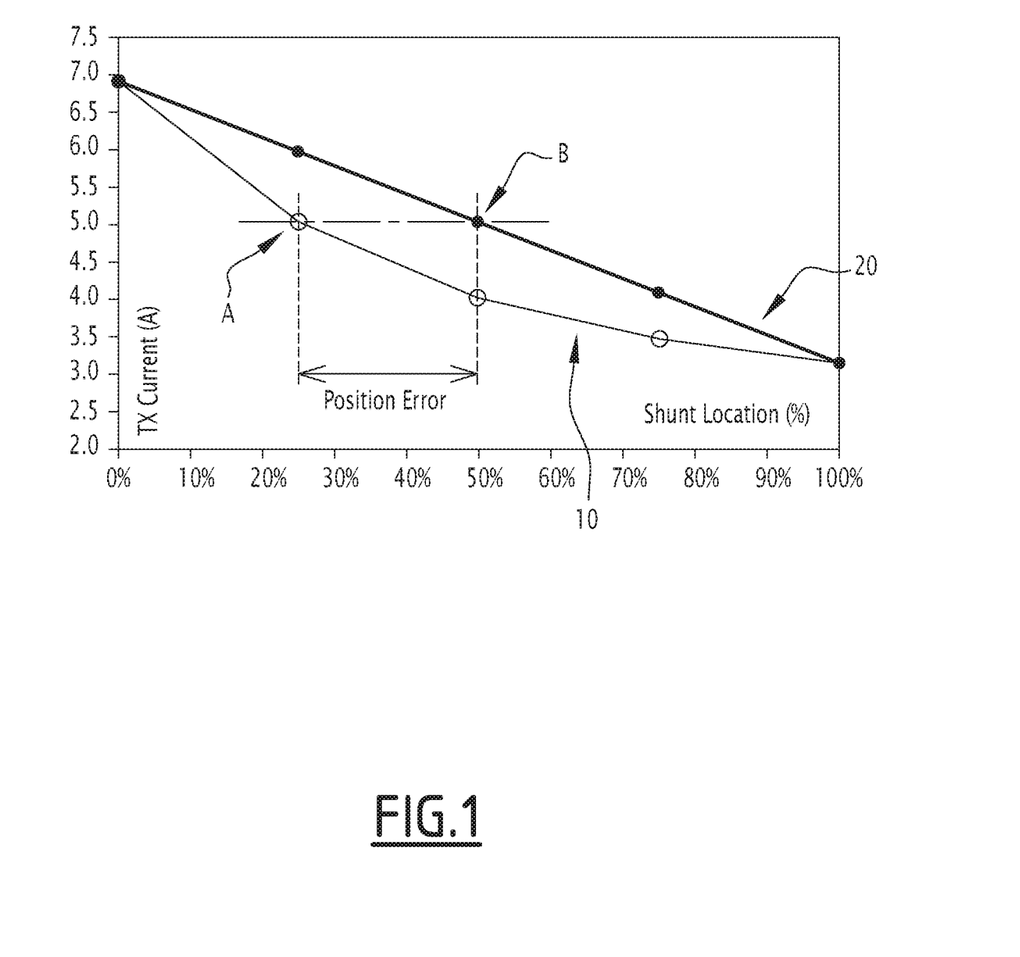
FIG. 1 shows a graph of actual and linearly estimated railway vehicle locations according to the prior art method.

In FIG. 1, a graph shows a track-circuit transmitted current vs. a shunt location and a first curve 10 represent an actual railway vehicle location, while a second curve 20 represent a railway vehicle location that would be obtained if a linear relationship between the track-circuit current signal and the railway vehicle location were assumed. As evident, taken an exemplary actual position A on the first curve, in case of linear assumption, this would lead to a position error in the determination of the reported location B of the railway vehicle.

The placement of these calibrating shunts is a manual process that takes a lot of time and requires blocking the track from railway vehicle movements. The method of shunting only provides a calibrated reference, for track-circuit transmitted current signals versus the railway vehicle location, at one moment in time. The relationship between the track-circuit transmitted current signal and the railway vehicle location may vary over time due to changes in the track circuit condition (such as rail resistance or track wire connection resistance). Rail resistance may change as a function of temperature or due to some defect in the rails. Track wire connection resistance may change due to the degradation of welds or bonds.

As an alternative to the above technique, it may be possible to run a "calibrating railway vehicle" through the railway track block, at a constant speed, so that the track circuit can collect the information it needs to build a calibrated reference. However, this would not be practical because it would require a special coordination with the "calibrating railway vehicle" and, furthermore, it is unknown how accurately a railway vehicle can hold a constant speed given variation in track grade and curvature.

In other cases, a computer exists on the "calibrating railway vehicle" that could provide GPS location and speed information to the track circuit equipment for providing a calibrated reference. However, it is unknown if the fidelity/precision of this data is sufficient, nor it is known if this data can be efficiently/promptly transferred from the passing rolling stock to a track circuit equipment.

SUMMARY OF THE INVENTION

There is therefore the need to develop an innovative method and controller for determining the relationship between a track-circuit transmitted current signal and a railway vehicle location, which is not based on manual shunting or any of the other expensive and impractical methods described above, and that can be dynamically adjusted without human intervention, thus limiting the impact on railroad operations.

These and other objects are fully achieved by virtue of a method for determining the relationship between a track-circuit transmitted current signal and a railway vehicle location having the characteristics defined in independent claim 1, by a controller for determining the relationship between a track-circuit transmitted current signal and a railway vehicle location having the characteristics defined in independent claim 9 and by a track circuit as defined in claim 10.

Preferred embodiments of the invention are specified in the dependent claims, whose subject-matter is to be understood as forming an integral part of the present description.

BRIEF DESCRIPTION OF THE DRAWINGS

Further characteristics and advantages of the present invention will become apparent from the following description, provided merely by way of a non-limiting example, with reference to the enclosed drawings, in which.

DESCRIPTION OF THE PREFERRED EMBODIMENTS

The method of the invention allows performing a dynamic determination of the relationship between the transmitted current signal and the railway vehicle location without requiring human intervention and without impacting railway vehicle operations, and it is completely autonomous and adaptable to changing conditions.

The method of the present invention allows therefore estimating the relationship between a track-circuit transmitted current signal and a railway vehicle location in an automatic manner.

The method of the present invention is based on the use of Dynamic Time Warping.

The Dynamic Time Warping (further referenced as DTW) method, which is per se known, allows for the non-linear mapping of one signal to another by minimizing the distance between the two. The method finds an optimal alignment between two signals, also called sequences, and captures similarities by aligning the coordinates inside both sequences. DTW was previously used for speech recognition in order to compare signals that were not synchronized (aligned) in time.

With regard to virtual block track circuits, the method of the present invention uses DTW to first align transmitted track-circuit current signals (versus time) coming from a plurality of railway vehicles running on a railway track block, and then to calculate a reference curve as the average value of all the aligned curves (versus location). This reference curve represents the relationship between the track-circuit transmitted current and the railway vehicle location on the railway track block for which it has been calculated.

In particular, a track circuit transmits a plurality of current signals towards a respective plurality of railway vehicles, while measuring these signals, the signals being then analyzed by a controller, connected to said track circuit, as here below disclosed. The controller is therefore arranged to perform the DWT method here below disclosed.

Figure 2:
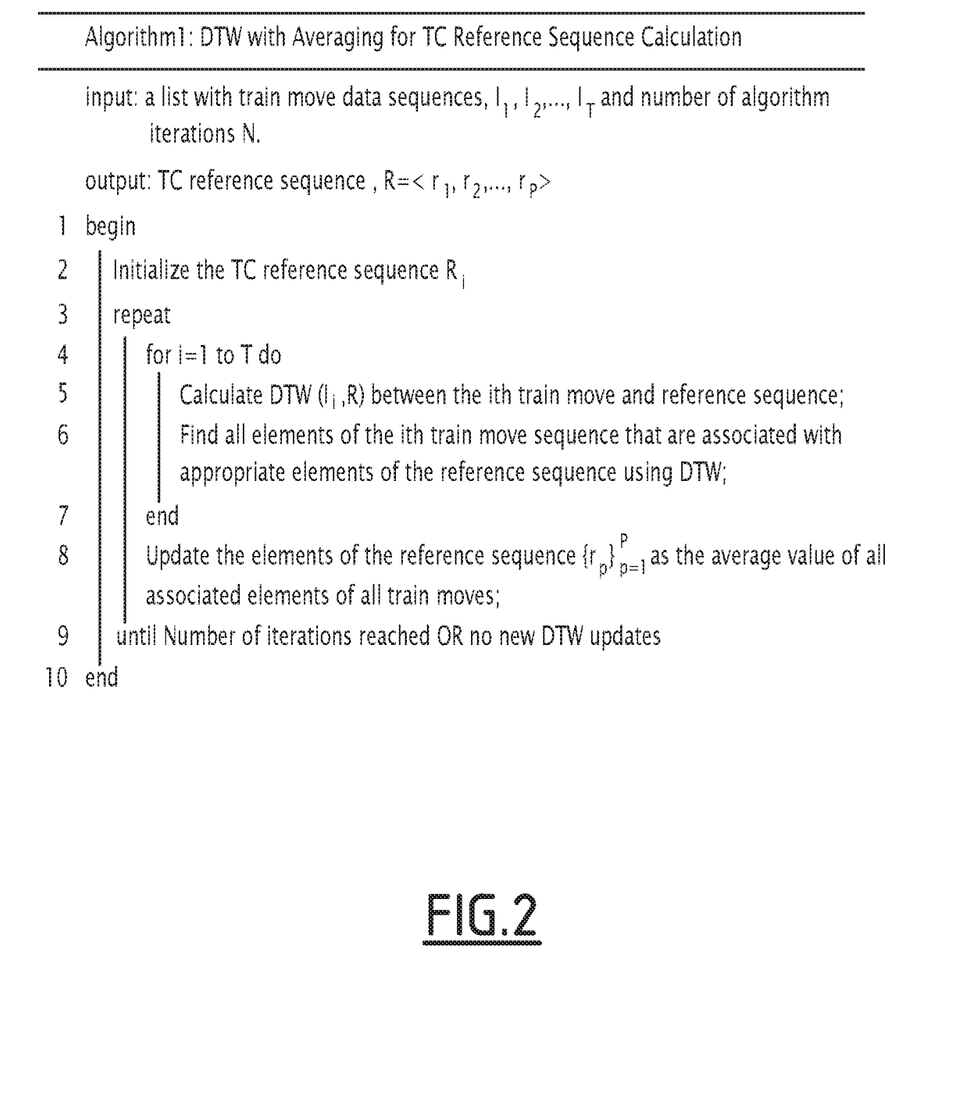
FIG. 2 shows a list of the steps of the Dynamic Time Warping (DTW) algorithm.

Formally, the DTW method, is illustrated in the below algorithm.

The main inputs of this algorithm are:
a list of railway vehicle move sequences. Each individual $i^{th}$ railway vehicle move sequence, $I_i = (I_{i,1}, I_{i,2}, \ldots I_{i,Ti})$ contains transmitted current peak current values $I_{i,j}$, where j represents an index of the $j^{th}$ element of the sequence (i.e. the $j^{th}$ sample of the current signal transmitted by the track circuit), and $T_i$ is the total number of samples of the transmitted current, associated to the $i^{th}$ railway vehicle movement (i.e. associated to the $i^{th}$ railway vehicle of the plurality of railway vehicles for which the I sequence is calculated), and
the maximum number of algorithm iterations, N.

The algorithm outputs a reference sequence (curve) $R = (r_1, r_2, \ldots, r_P)$, where $r_p$ represents the $p^{th}$ element of the reference sequence and P is the total number of elements in the reference sequence.

FIG. 2 shows a list of the steps of the DTW algorithm, which will be disclosed here below with reference to the numbered steps of FIG. 2. The term "railway vehicle" in FIG. 2, and in the following description of the DTW algorithm for coherence, is replaced by "train".

The algorithm starts by initializing, at step 2, the elements of the reference curve by either (1) randomly selecting an $i^{th}$ sequence from the input list, or (2) selecting an input sequence that has the smallest overall pair-wise DTW score.

Then, at step 5, for each $i^{th}$ train move, the DTW is performed between the $i^{th}$ sequence and the current reference curve. Based on the DTW algorithm, at step 6, for each $p^{th}$ element in the reference curve, an appropriate set of elements from the $i^{th}$ sequence is associated with said each $p^{th}$ element in the reference curve.

Next, at step 8, each $p^{th}$ element of the reference curve is updated by calculating the average of all associated elements, found in step 6, from the train move sequences.

The algorithm stops at step 9 when the number of iterations N is reached or if there are no new DTW associations between the reference and train move curves.

Track circuits capture transmitted currents versus time. The number of transmitted current samples captured as the railway vehicle traverses an entire railway track block varies based on the speed of the railway vehicle. For faster railway vehicles, there are fewer samples, for slower railway vehicles, there are more samples. If these samples could be captured versus distance, each passing railway vehicle should show the same relationship of transmitted current versus railway vehicle location.

The present invention proposes to capture the transmitted current for several passing railway vehicles (for example 100 railway vehicles in the example below). The transmitted current samples are plotted in the graph of FIG. 3. The x-axis represents the indices of the samples. For a fixed sample rate and railway vehicles moving at different speeds, a different number of samples for each railway vehicle move is obtained. Faster railway vehicles are those on the right of the group of curves.

Figure 3:
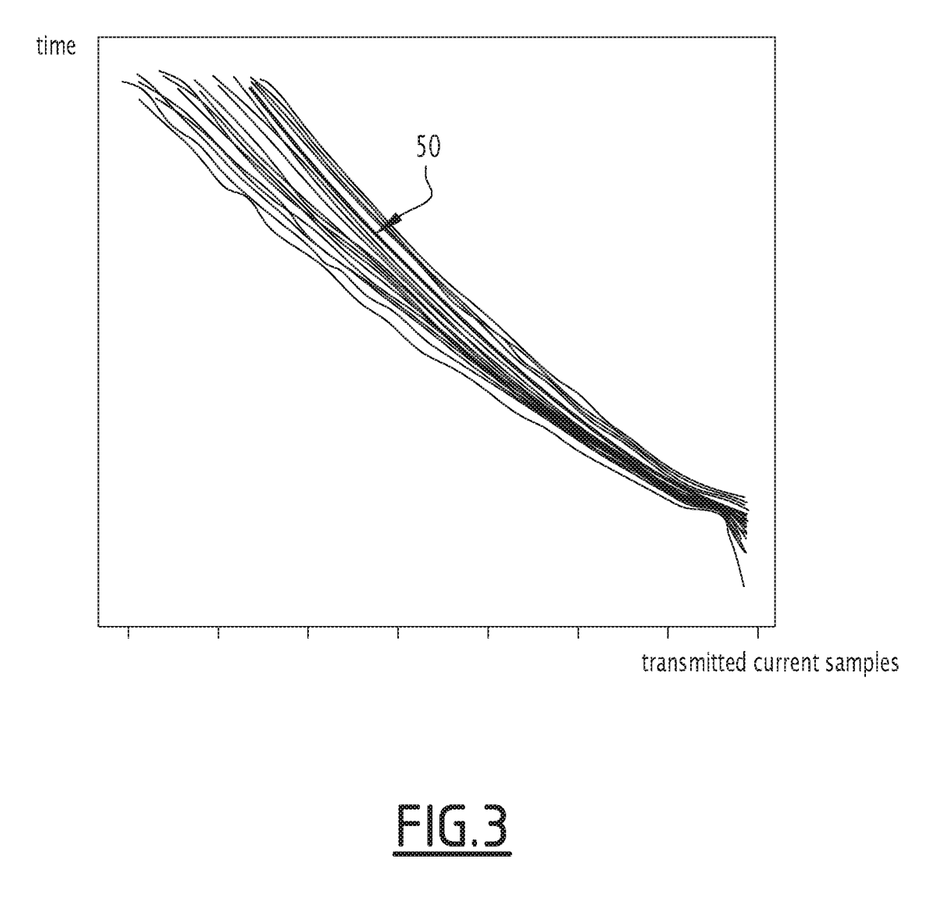
FIG. 3 is a graph of transmitted current samples versus time for various train moves through a track-circuit.

Each $i^{th}$ train move, that contain $T_i$ samples, is presented as a line in FIG. 3. This means that for different railway vehicles running at different speeds, the total number of samples T will be different. Each train move may contain a different number of corresponding samples $T_i$.

The length of time for each railway vehicle to traverse a track section varies based on how fast the railway vehicle is traveling. The DTW algorithm takes these curves from passing railway vehicles and aligns them into a single curve 50 with the same relative horizontal axis (which, in this case, can be equated to distance).

Figure 4:
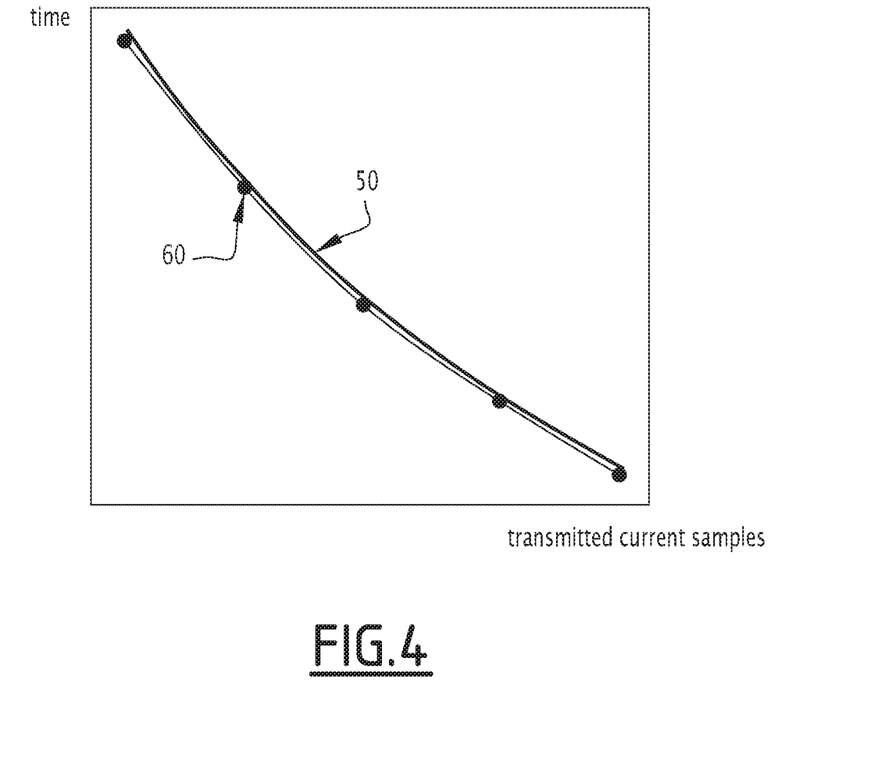
FIG. 4 is a graph showing the single curve output from the DTW algorithm (called the Reference Curve) and the actual transmit current versus distance measured by manually shunting the track with reference to a same track circuit.

The single curve 50 represents the calibrated reference of transmitted current versus railway vehicle location. The single curve 50 presents a mean, or average, sequence obtained from the DTW algorithm and the provided input group of real sequences related with individual railway vehicle moves. To validate the effectiveness of the DTW algorithm, this single curve 50 has been compared to a measured transmitted current when manual shunts had been placed at carefully surveyed locations and it has been found that there is an almost ideal match, as evident from FIG. 4 which is a graph showing the single curve 50 obtained from the DTW algorithm and a measured curve 60 obtained from manually shunting surveyed locations with reference to a same track circuit.

If track circuit conditions were to change, such that the relationship between transmitted current and railway vehicle location were to change, the DTW reference curve can be reset. The need for this may be identified by quantifying the fit of the curve from each passing railway vehicle to the existing DTW reference curve. If the fit is not within the expected bounds for several consecutive passing trains, this is an indication that the DTW reference curve should be reset.

This can be done automatically by the track circuit equipment without the need for human intervention, coordination with rolling stock, or impact to train operations.

The method above disclosed is focused on estimating the nominal railway location as it relates to the transmitted current signal. The reference curve, as such, represents an estimation of the true railway vehicle location as a set of point relationships between the railway vehicle location and the transmitted current signal through the entire length of a section. However, there are expected errors in both the measurement system for the transmitted current signal and for the reference curve to estimate the nominal railway vehicle location. Because the railway vehicle location is a safety critical function, an appropriate safety buffer must be applied to the reported railway vehicle location, inclusive of these errors, such that the probability of the railway vehicle being outside this safety buffer is acceptably low.

This means that when reporting the actual position of the train a certain amount is added to it, this amount being the buffer, and it must be greater than or equal to the amount of error that can be expected in the measurement system and DTW algorithm estimation of the reference curve. This implies to be certain that when the position of the rear of a railway vehicle is reported, the next railway vehicle following it will never be able to collide with the rear of the railway vehicle placed in front of it, inclusive of location errors of the method.

In fact, it would be desirable to locate a railway vehicle with greater resolution/accuracy.

In general, the error range is defined as confidence interval (CI) and the reported railway vehicle location compared to the nominal railway vehicle location is called safety margin (SM).

The confidence interval is defined by lower and upper boundaries and represent an area within which it is assured that true location of the railway vehicle location is within a certain probability, for example 80%.

Figure 5:
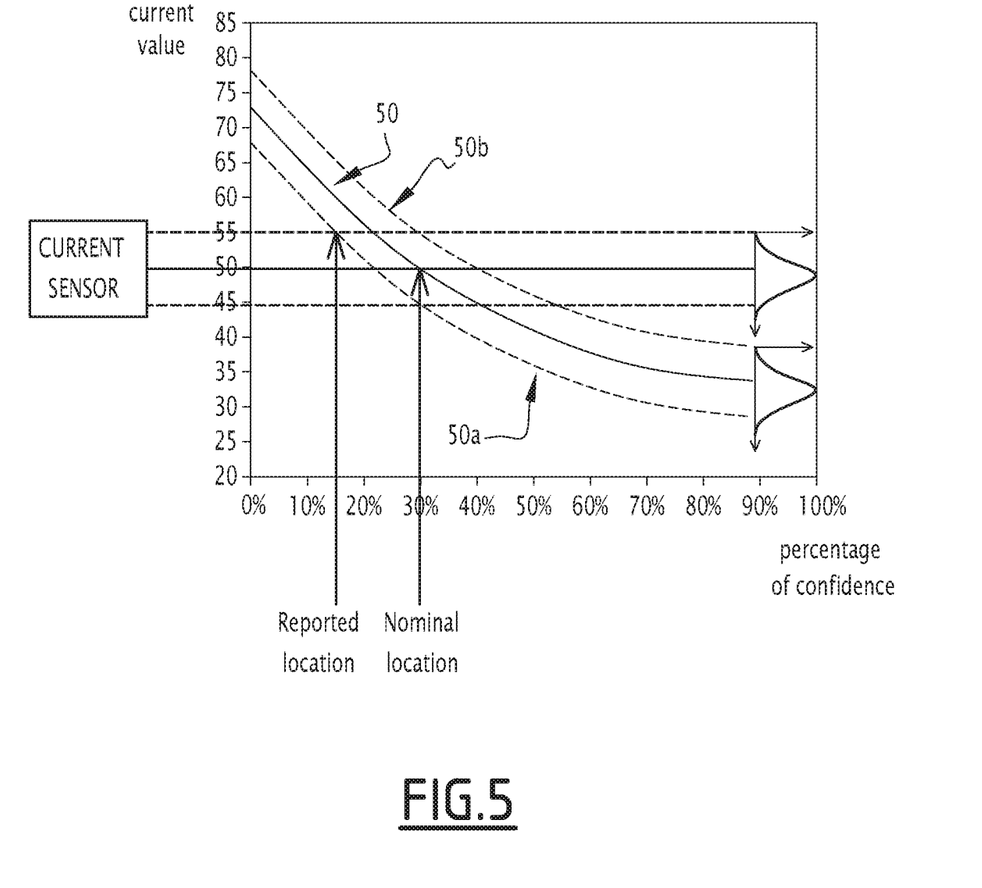
FIG. 5 shows the nominal and the reported location of a railway vehicle considering the confidence interval and safety margin.

FIG. 5 shows the nominal location of a railway vehicle that comes from the intersection of the transmitted current value measured by the current sensor of the track circuit with the reference curve 50. A safer reported railway vehicle location (which takes into account all sources of error) comes from the intersection of an increased current value, obtained by adding a fixed amount of current to the current value measured by the current sensor of the track circuit, with a lower dashed curve 50a, which represents the confidence interval. The safety margin is the difference between the reported location and the nominal location of FIG. 5.

In an alternative embodiment of the present invention, therefore, the method for determining the relationship between a track-circuit transmitted current signal and a railway vehicle location further calculates both the confidence interval and the safety margin, using a bootstrap percentiles method per se known. This allows determining the amount of buffer that it is necessary to guarantee that the true location of the railway vehicle is not outside of this buffer.

Figure 6:
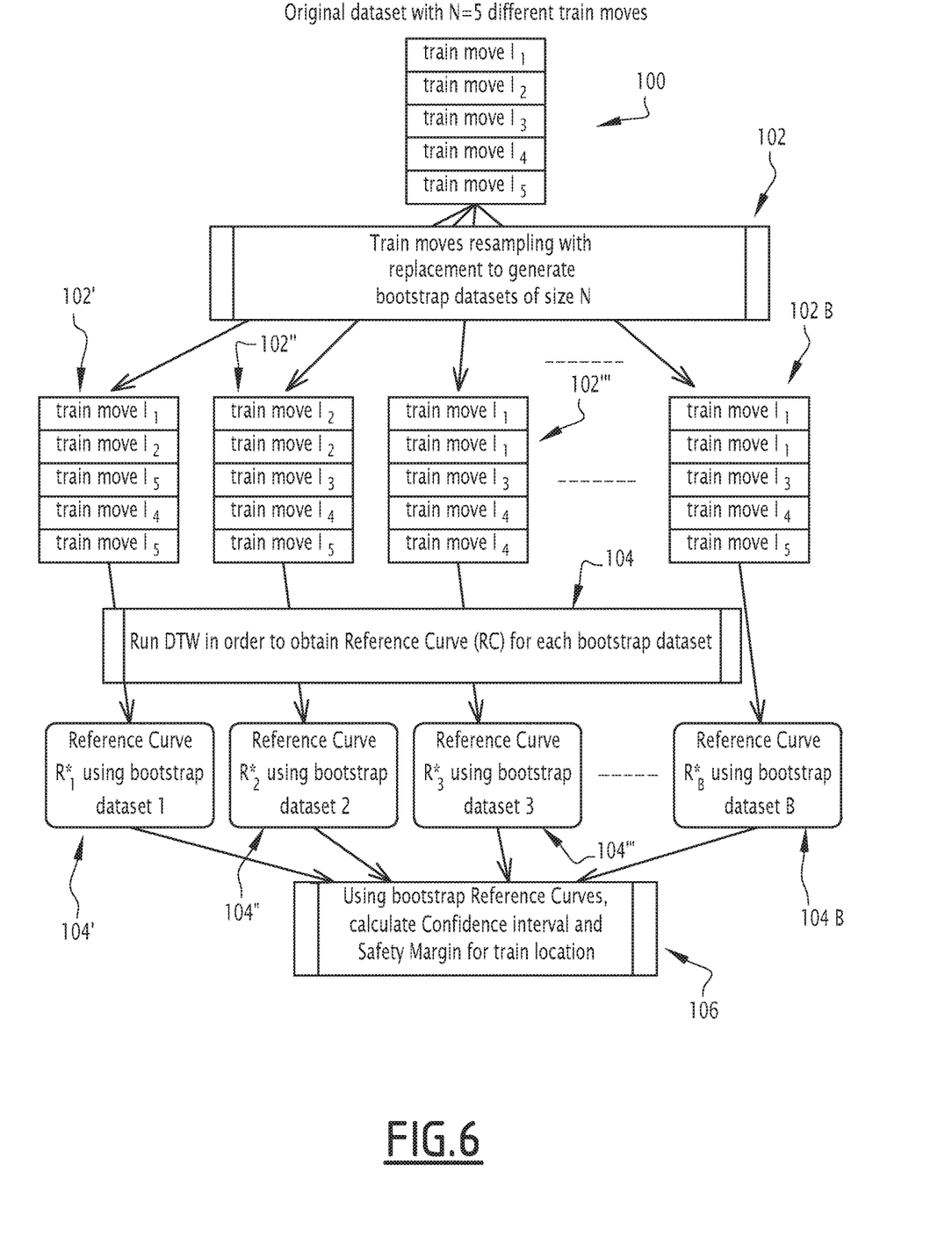
FIG. 6 shows a block diagram of the steps for calculating the confidence interval and the safety margin.

FIG. 6 shows a block diagram of the steps for calculating the confidence interval and the safety margin. The term "railway vehicle" in FIG. 6, and in the following description of the steps for calculating the confidence interval and the safety margin for coherence, is replaced by "train".

Formally, the confidence interval and the safety margin are calculated as follows.

In a step 100, N train moves are collected (for example, $I_1, I_2, I_3, I_4, I_5$, with N=5) wherein each train move contains transmitted current values equally spaced in time. For example, the n-th train move $I_n$ contains $(I_{n,1}, I_{n,2}, \ldots I_{n,Nn})$ values, where $I_{n,i}$ presents i-th transmitted current sample of the train move $I_n$, and Nn is the total number of samples in the train move. The collected train moves form altogether a train move data set.

In a next step 102, a plurality B of bootstrap train move datasets of size N are created by resampling the original train move data set with a replacement set. Resampling is performed by randomly selecting train moves from the original set with probability of 1/N. Some examples of bootstrap datasets 102', 102'', 102''', . . . , 102$^B$ are presented in FIG. 6. For example, in a first bootstrap dataset 102', the train moves $I_1, I_2$, and $I_4$, are available once, the train move $I_5$ is available two times, and the train move $I_3$ is omitted and thus, it is not available in the bootstrap dataset.

The plurality B of bootstrap train move datasets do not contain two or more same bootstrap datasets.

In a next step 104, each of the plurality B of bootstrap datasets is used to calculate a respective reference curve 104', 104'', 104''', . . . , 104$^B$ (generally referred in the following as $R^{*b}$) Therefore, each b-th bootstrap dataset is associated with a $R^{*b}$ reference curve.

For each given transmitted current value $T_x$ and (1−2α) 100% percentile interval of the calculated reference curves, a lower $Ri(T_x)$ and upper $Ru(T_x)$ value are set to the $B_{\alpha\text{-}th}$ and $B_{(1-\alpha)\text{-}th}$ percentile of the $R^{*b}(T_x)$ values, respectively. Each pair (Ri(Tx), Ru(Tx)) constitutes the train location range calculated, for each given transmitted current value, within the train that can be found with uncertainty of 2α.

α represent the half-percentile of the confidence interval.

By joining all the lower Ri(Tx) calculated for a plurality of transmitted current values, and similarly by joining the upper Ru(Tx) values calculated for the same transmitted current values, the lower dashed curve 50a, and a respective upper dashed curve 50b, are obtained. More especially, a lower confidence interval is calculated as the a-percentile of all reference curves obtained from the bootstraping method. Similarly, for an upper confidence interval the (1−α) percentile of all B bootstrap reference curves is considered.

Finally, in a step 106, the safety margin is calculated using the lower Ri(Tx) values, wherein the transmitted current values $T_x$ are between a specified range. For example a mean of (Ri(Tx)_Tx) values is calculated.

Since the transmitted current is used to determine the railway vehicle location, the railway vehicle should be located closer to the transmitter than it actually is (the safe direction of error when considering the location of two trains following each other), this representing the lower confidence interval or Ri(Tx).

Figure 7:
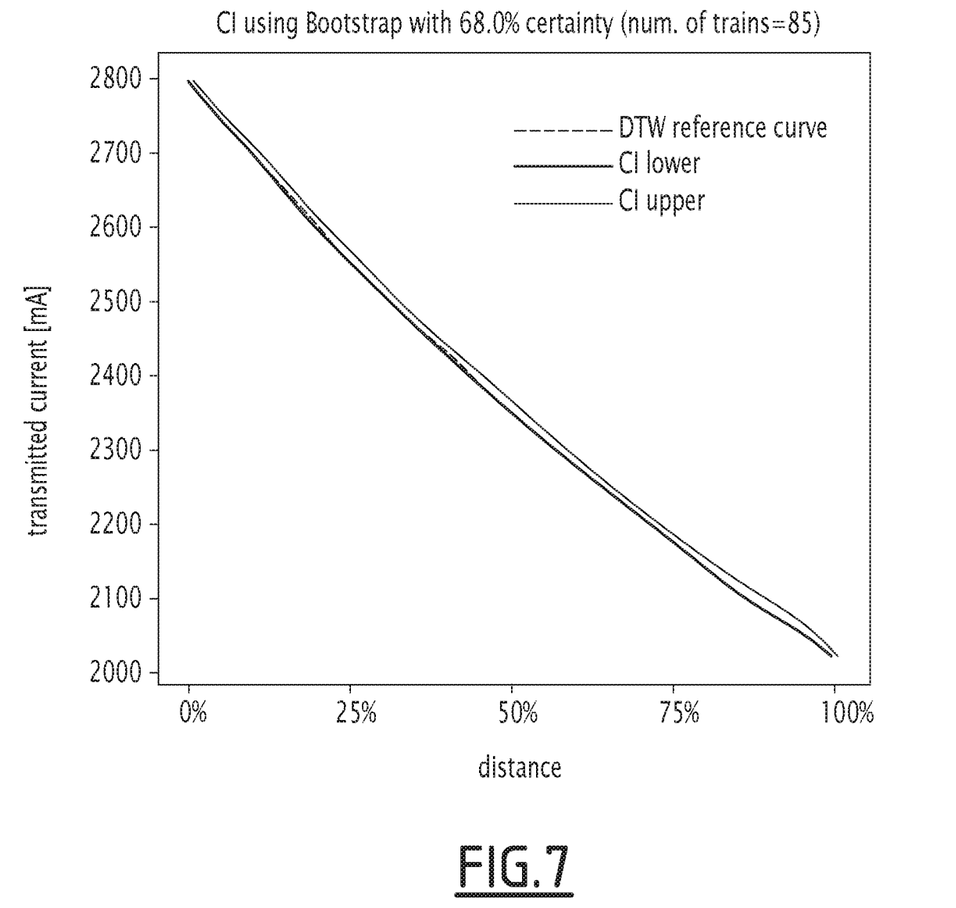
FIGS. 7-9 show examples of confidence interval ranges for different transmitted current values calculated using the method according to the present invention.
Figure 8:
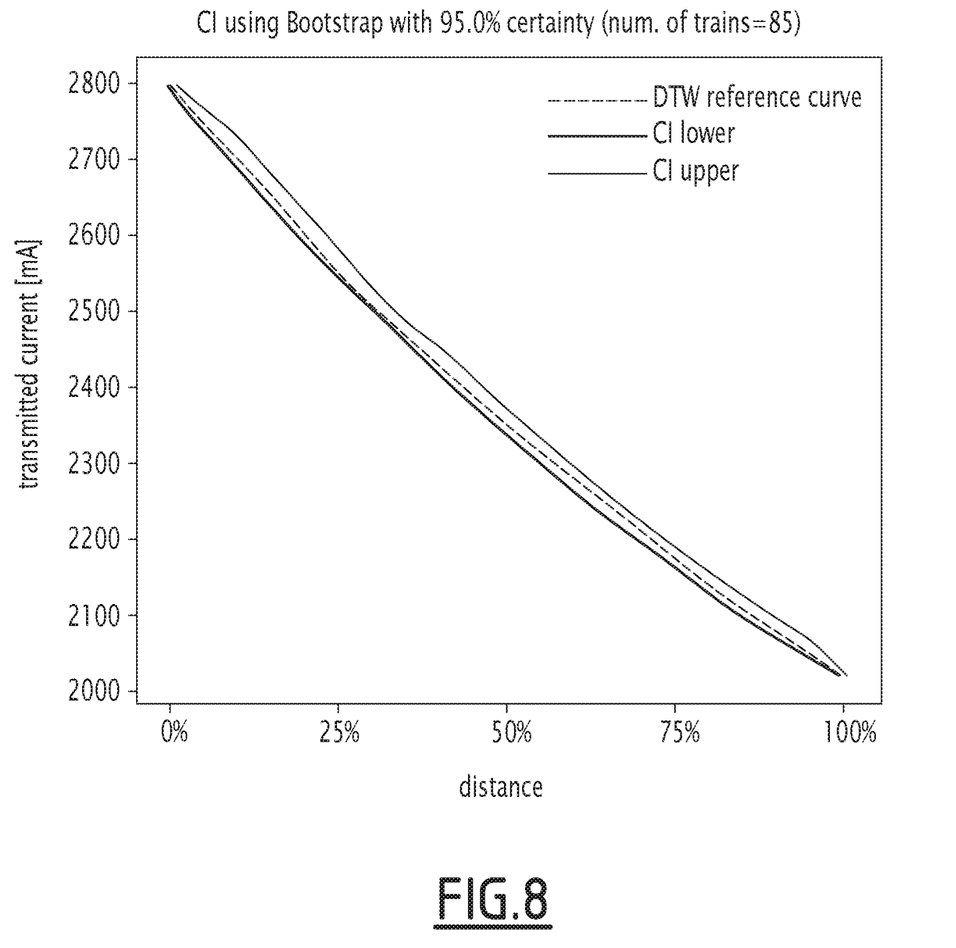
Figure 9:
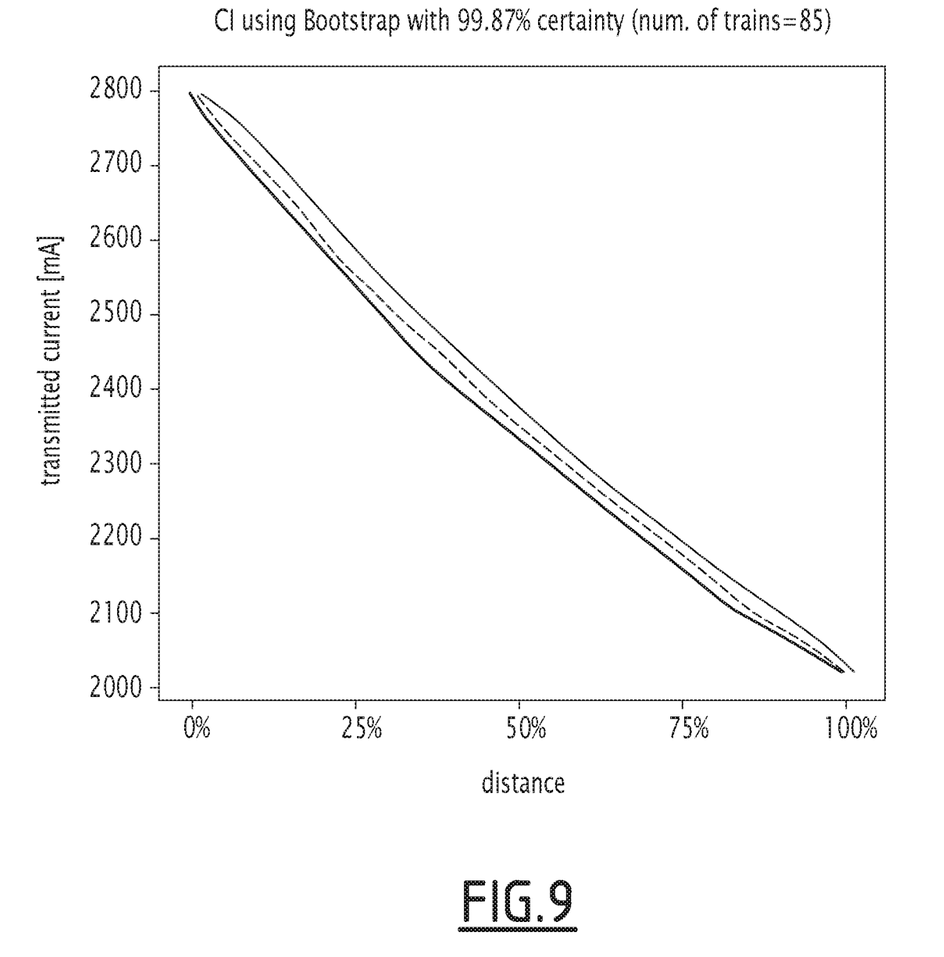

FIGS. 7-9 show examples of confidence interval ranges for different transmitted current values calculated using the above-disclosed method. In these figures the reference curve is calculated using 85 train moves, which is presented as a dashed line, while the confidence interval lower $R_l(Tx)$ (corresponding to CI lower) and upper $R_u(Tx)$ (corresponding to CI upper) boundaries, obtained using the proposed method, are illustrated in solid lines. The distance is presented as a percentage, which represents the location of the railway vehicle relative to the track circuit transmitter (where 0% is the near end of the block right to the transmitter and 100% is the far end of the block away from the transmitter). The figures show confidence interval values calculated for three different certainty values, $\alpha$=(68.0%, 95.0%, 99.87%).

The bootstrap method allows understanding the statistical variation of railway vehicle moves (to provide an adequate safe margin) without having to capture too many railway vehicles moves.

Clearly, the principle of the invention remaining the same, the embodiments and the details of production can be varied considerably from what has been described and illustrated purely by way of non-limiting example, without departing from the scope of protection of the present invention as defined by the attached claims.

The invention claimed is:

1. Method for determining the relationship between a track-circuit current signal and a railway vehicle location, comprising
sending, by a track circuit, current signal across a railway track block,
measuring the current signal for different railway vehicles running successively on the railway track block;
aligning said measured current signals and calculating a reference curve (R) as the average value of all the aligned curves by using a Dynamic Time Warping algorithm, this reference curve (R) representing the relationship between the measured track-circuit current signal and the railway vehicle location on said railway track block.

2. The method of claim 1, wherein the inputs of the Dynamic Time Warping algorithm are a plurality of current signals measured for several railway vehicle move sequences across the railway track block and a maximum number of algorithm iterations (N), wherein each current signal measured for an individual ($i^{th}$) railway vehicle move sequence ($I_i$) contains transmitted current peak values ($I_{(i,j)}$) of a plurality of samples of said measured track-circuit current signal.

3. The method of claim 2, wherein the reference curve (R) contains a plurality of elements ($r_1, r_2, \ldots, r_p$).

4. The method of claim 3, comprising the steps of:
a) initializing (2) the elements of the reference curve (R) by randomly selecting one current signal measured for an individual railway vehicle move sequence;
b) for each current signal measured for an individual railway vehicle move sequence performing (5) the Dynamic Time Warping algorithm between the current signal and the reference curve;
c) for each element ($p^{th}$) in the reference curve, associating (6) an appropriate set of elements from the current signal measured for an individual railway vehicle move sequence with said element ($p^{th}$) in the reference curve;
d) updating (8) each element ($p^{th}$) of the reference curve by calculating the average of all associated elements found in step c);
e) repeating steps a) to d) by initializing (2) the elements of the reference curve (R) with the elements of the updated reference curve calculated at step d), up to the maximum number of algorithm iterations (N).

5. The method of claim 4, further comprising the steps of determining a confidence interval and/or a safety margin using a bootstrap percentiles method.

6. Controller for determining the relationship between a track-circuit transmitted current signal and a railway vehicle location on a railway track, the controller being adapted to be connected to a track circuit arranged to send a current signal across a railway track block on which different railway vehicles are running successively, the controller being arranged to perform the method according to claim 4.

7. The method of claim 3, further comprising the steps of determining a confidence interval and/or a safety margin using a bootstrap percentiles method.

8. Controller for determining the relationship between a track-circuit transmitted current signal and a railway vehicle location on a railway track, the controller being adapted to be connected to a track circuit arranged to send a current signal across a railway track block on which different railway vehicles are running successively, the controller being arranged to perform the method according to claim 3.

9. The method of claim 2, further comprising the steps of determining a confidence interval and/or a safety margin using a bootstrap percentiles method.

10. Controller for determining the relationship between a track-circuit transmitted current signal and a railway vehicle location on a railway track, the controller being adapted to be connected to a track circuit arranged to send a current signal across a railway track block on which different railway vehicles are running successively, the controller being arranged to perform the method according to claim 2.

11. The method of claim 1, further comprising the steps of determining a confidence interval and/or a safety margin using a bootstrap percentiles method.

12. The method of claim 11, comprising the steps of:
collecting (100) transmitted current values measured for N railway vehicle moves, thus obtaining a railway vehicle move data set;
creating (102) a plurality of bootstrap railway vehicle move datasets (102', 102", 102''', . . . , 102B) of size N by resampling the original railway vehicle move data set with a replacement set, wherein resampling is performed by random selecting railway vehicle moves from the original set with probability of 1/N;
calculating (104) the reference curve (104', 104", 104''', $104^B$) for each bootstrap dataset.

13. The method of claim 12, comprising the step of:
determining, on the basis of the reference curves (104', 104", 104''', 104B) obtained for each bootstrap dataset, using a predetermined percentile interval, lower Ri(Tx) and upper Ru(Tx) confidence interval values for predefined measured track-circuit current values Tx.

14. The method of claim 13, comprising the step of:
setting (106) a safety margin in function of the mean value of the lower (Ri(Tx)) confidence interval values.

15. Controller for determining the relationship between a track-circuit transmitted current signal and a railway vehicle location on a railway track, the controller being adapted to be connected to a track circuit arranged to send a current signal across a railway track block on which different railway vehicles are running successively, the controller being arranged to perform the method according to claim 14.

16. Controller for determining the relationship between a track-circuit transmitted current signal and a railway vehicle location on a railway track, the controller being adapted to be connected to a track circuit arranged to send a current signal across a railway track block on which different railway vehicles are running successively, the controller being arranged to perform the method according to claim 13.

17. Controller for determining the relationship between a track-circuit transmitted current signal and a railway vehicle location on a railway track, the controller being adapted to be connected to a track circuit arranged to send a current signal across a railway track block on which different railway vehicles are running successively, the controller being arranged to perform the method according to claim 12.

18. Controller for determining the relationship between a track-circuit transmitted current signal and a railway vehicle location on a railway track, the controller being adapted to be connected to a track circuit arranged to send a current signal across a railway track block on which different railway vehicles are running successively, the controller being arranged to perform the method according to claim 11.

19. Controller for determining the relationship between a track-circuit transmitted current signal and a railway vehicle location on a railway track, the controller being adapted to be connected to a track circuit arranged to send a current signal across a railway track block on which different railway vehicles are running successively, the controller being arranged to perform the method according to claim 1.

20. Track circuit comprising a controller according to claim 19.

* * * * *